US006466297B1

(12) United States Patent
Goulding et al.

(10) Patent No.: US 6,466,297 B1
(45) Date of Patent: Oct. 15, 2002

(54) METHOD OF PREPARING A BROADBAND REFLECTIVE POLARIZER

(75) Inventors: Mark Goulding, Dorset (GB); David Coates, Dorset (GB); John Patrick, Dorset (GB); Mark Verrall, Dorset (GB); John Argent, Dorset (GB)

(73) Assignee: Merck Patent Geselleschaft mit Beschrankter Haftung (DE)

( * ) Notice: Subject to any disclaimer, the term of this patent is extended or adjusted under 35 U.S.C. 154(b) by 157 days.

(21) Appl. No.: 09/609,396

(22) Filed: Jul. 3, 2000

(30) Foreign Application Priority Data

Jul. 2, 1999 (EP) .............................................. 99112661

(51) Int. Cl.$^7$ ................................................. G02B 5/30
(52) U.S. Cl. .................. 349/175; 252/299.01; 252/585; 349/179; 428/1.31
(58) Field of Search ........................... 252/585, 299.01; 349/98, 175, 179; 428/1.31

(56) References Cited

U.S. PATENT DOCUMENTS

| 5,506,704 A | * | 4/1996 | Broer et al. .............. 252/299.7 |
| 5,514,296 A | * | 5/1996 | Chen et al. ............ 252/299.01 |
| 5,793,456 A | * | 8/1998 | Broer et al. ................. 349/175 |
| 6,016,177 A | * | 1/2000 | Motomura et al. ......... 349/175 |

* cited by examiner

*Primary Examiner*—Robert Dawson
*Assistant Examiner*—Marc S. Zimmer
(74) *Attorney, Agent, or Firm*—Millen, White, Zelano & Branigan, P.C.

(57) ABSTRACT

The invention relates to a method of preparing a broadband reflective polarizer comprising the blending a first mixture A comprising at least one achiral polymerizable mesogenic compound with a second mixture B comprising at least one chiral polymerizable mesogenic compound; and coating a layer of the blended mixture onto a first substrate and aligning the chiral mesogenic material in a planar orientation so that the axis of the molecular helix extends transversely to the layer.

19 Claims, 5 Drawing Sheets

| |
|---|
| 14b |
| 12b |
| 11b |
| 10b |
| TAC |
| 2b |
| 5b |
| 6b |
| 9b |

METHOD OF PREPARING A BROADBAND REFLECTIVE POLARIZER

FIELD OF THE INVENTION

The invention relates to a method of preparing a broadband reflective polarizer comprising two or more layers of a polymerized mesogenic material with helically twisted molecular structure and planar orientation. The invention further relates to a broadband reflective polarizer obtainable by such a method. The invention also relates to the use of such a broadband reflective polarizer in liquid crystal displays, projection systems, decorative and security applications.

BACKGROUND AND PRIOR ART

Reflective films comprising cholesteric liquid crystal materials have been proposed in prior art for a variety of uses, for example as broadband or notch polarizers, as color filters in displays or projection systems, and for decorative purposes, like the preparation of colored image films or cholesteric pigment flakes.

These films usually comprise one or more layers of a cholesteric liquid crystalline material with planar alignment and show selective reflection of light.

The term "planar alignment" as used in this application in connection with a layer of a liquid crystal material with helically twisted molecular structure means that the material exhibits an orientation wherein the axis of the molecular helix is oriented substantially perpendicular to the plane of the layer, i.e., substantially parallel to the layer normal. This definition also includes orientations where the helix axis is tilted at an angle $\leq 10°$, in particular $\leq 5°$, very preferably $\leq 2°$ relative to the layer normal.

The bandwidth $\Delta\lambda$ of the waveband reflected by a reflective film as described above is depending on the birefringence of the mesogenic material $\Delta n$ and the pitch of the molecular helix p according to the equation $\Delta\lambda = \Delta n \times p$. Thus, the bandwidth among other factors is determined by the birefringence of the material.

For an application as broadband polarizer in liquid crystal displays, it is desirable that the bandwidth of the reflective film should comprise a substantial portion of the visible wavelength range, whereas for an application as notch polarizer or as colored reflective film, e.g. in decorative or security applications, often films having a specific reflection color are desired.

In particular broadband reflective polarizers, also known as circular polarizers, which are transmitting circularly polarized light of a broad wavelength band covering a large part of the visible spectrum, are suitable as polarizers for backlit liquid crystal displays.

If unpolarized light is incident on such a reflective polarizer, 50% of the light intensity is reflected as circularly polarized light with the same twist sense as that of the molecular helix, whereas the other 50% is transmitted. The reflected light is depolarized (or its sense of polarization is reversed) in the backlight of the display, and is redirected onto the polarizer. In this manner theoretically 100% of a given waveband of the unpolarized light incident on the reflective polarizer can be converted into circularly polarized light.

The circularly polarized light can be converted into linear polarized light by means of a quarter wave optical retarder and optionally also a compensation film.

Recently reflective polarizers have been developed that comprise a single layer of liquid crystalline material with helically twisted structure and planar orientation wherein the pitch of the molecular helix is varying in a direction normal to the layer, leading to a large bandwidth of the reflected wavelength band. Such polarizers are described for example in EP 0 606 940-A2 and in WO 97/35219.

A simpler way to provide a broadband reflective polarizer is to stack several reflective layers with different reflection wavebands on top of each other to obtain a multilayer polarizer.

Multilayer reflective polarizers have been described in prior art. For example, EP 0 634 674 suggests to prepare a multilayer cholesteric liquid crystal polymer film by bringing together a pair of chiral nematic liquid crystal polymer films, applying pressure, and heating the polymers above their glass transition temperature to allow the films to adhere.

Maurer et al., SID 90 Digest, Vol. 21, pp. 110 (1990) describe a polarizing color filter obtained by combining several polarizing films with different reflection wavelength. For the preparation of each film, a layer of a cholesteric liquid crystal side chain polysiloxane comprising chiral and achiral sidegroups is brought between two glass plates and oriented by shearing at high temperatures.

JP 01-133003-A discloses a polarizing plate that is obtained by lamination of one or more cholesteric liquid crystal polymer layers onto a quarter wave plate. JP 08-271731-A discloses a similar polarizing plate, but wherein the quarter wave plate comprises at least two retardation films having different retardation.

However, the methods of preparing a multilayer cholesteric polarizer as described in the above documents bear several disadvantages. Thus, it is often very difficult, and requires high temperatures, to achieve uniform alignment in a liquid crystal polymer layer. For example, Maurer et al. mention an aligning temperature of 150° C., whereas JP 01-133003-A and JP 08-271731-A mention that temperatures well above the glass temperature of the liquid crystal polymers are required. This is especially disadvantageous when polymers with high glass temperatures, like acrylates, styrenes or methacrylates are used, and is highly unsuitable in particular for mass production.

Furthermore, according to the method of multilayer preparation as described e.g. in JP 01-133003-A, the materials have to be selected such that the different layers exhibit different glass temperatures. Thus, when laminating and aligning e.g. a second layer on top of a first layer, the aligning temperature (and thus the glass temperature) of the second layer has to be lower than the glass temperature of the first layer, so as not to affect the uniform orientation of the first layer. This limits severely the choice of suitable materials and makes the production process more complicated.

Therefore, there was a need for a method to prepare a broadband reflective polarizer in an efficient and cost-effective manner that does not have the above mentioned drawbacks, allows better and more easy control of the reflection wavelength and is particularly suitable for mass production.

One aim of the present invention is to provide a method of preparing a broadband reflective polarizer that fulfills the above requirements. Other aims of the invention are immediately evident to a person skilled in the art from the following description.

It has been found that, by providing a method of preparing a broadband reflective polarizer according to the present invention, it is possible to overcome the drawbacks of the methods described in prior art.

Accordingly, the present invention provides a method of preparing a broadband reflective polarizer including two or more layers of a polymerized mesogenic material with helically twisted molecular structure and planar orientation. Each of the layers is prepared by blending a first mixture A with a second mixture B to obtain a chiral polymerizable mesogenic material. The first mixture A may include at least one achiral polymerizable mesogenic compound, optionally a polymerization initiator component, and optionally an organic solvent component. The second mixture B may include at least one chiral polymerizable mesogenic compound, optionally a polymerization initiator component, and optionally an organic solvent component. The method may also include coating a layer of the blended mixtures A and B onto a first substrate or between a first and a second substrate, and aligning the chiral polymerizable mesogenic material in a planar orientation so that the axis of the molecular helix extends transversely to the layer. What is more, the method can include polymerizing the aligned material, and optionally removing the first and, if present, the second substrate from the polymerized layer. Desirably, the ratio of the blended mixtures A and B in each of the layers is chosen to be different from the other layers.

BRIEF DESCRIPTION OF THE DRAWINGS

Thus, the layers of the multilayer polarizer are prepared by in-situ polymerization of an aligned polymerizable liquid crystal polymer mixture.

Figure 1:
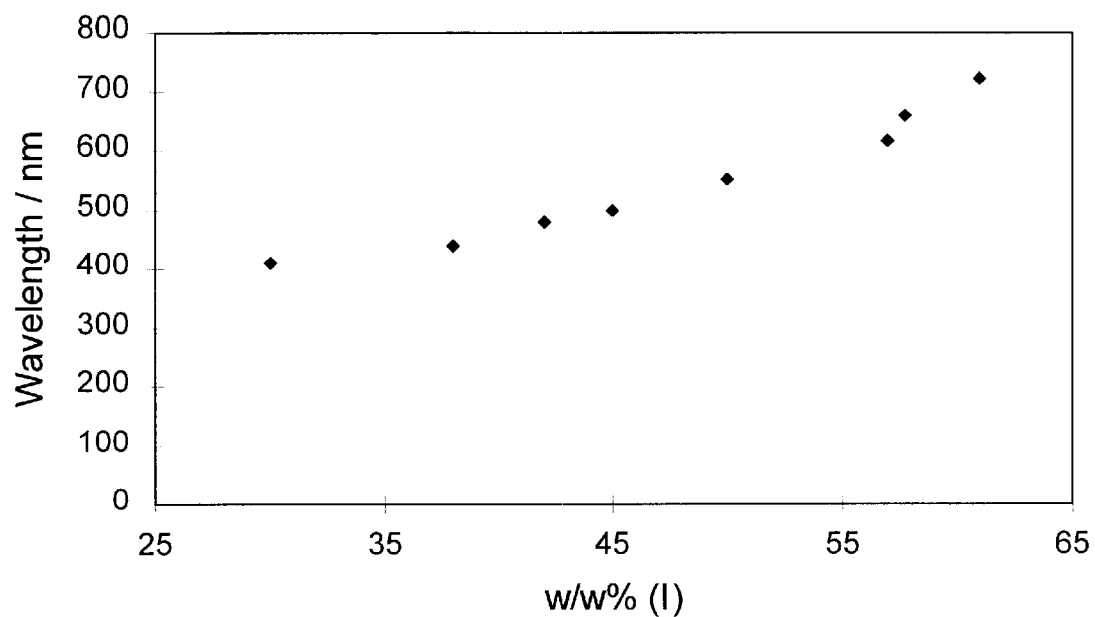
FIG. 1 depicts the central reflection wavelength of a number of polymerizable cholesteric mixtures according to example 1 versus the ratio of the achiral compound in the mixture.

In this application, the minimum and maximum wavelengths of the waveband reflected by an inventive reflective film, i.e. the edges of the band, are not given as the values for half the values of the maximum of the bands. For practical reasons the minimum and maximum wavelengths are defined as those wavelengths on the given flank where the curve has the steepest slope in absolute values. The bandwidth is simply given as the difference between minimum and maximum wavelength. The central reflection wavelength, also called short reflection wavelength or wavelength of reflection, is given as the arithmetical average of the minimum and maximum wavelength.

The term reflective film as used in this application includes self-supporting, i.e. free-standing, films that show more or less pronounced mechanical stability and flexibility, as well as coatings or layers on a supporting substrate or between two substrates.

DETAILED DESCRIPTION OF THE INVENTION

A feature of the present invention is a method of preparing a broadband reflective polarizer comprising two or more layers of a polymerized mesogenic material with helically twisted molecular structure and planar orientation, characterized in that each of said layers is prepared by a process comprising the following steps a) blending a first mixture A comprising the following components A1) at least one achiral polymerizable mesogenic compound, A2) optionally a polymerization initiator component, A3) optionally an organic solvent component, with a second mixture B comprising the following components B1) at least one chiral polymerizable mesogenic compound, B2) optionally a polymerization initiator component, B3) optionally an organic solvent component, in a given ratio, to obtain a chiral polymerizable mesogenic material, b) coating a layer of the blended mixtures A and B onto a first substrate or between a first and a second substrate, and aligning the chiral polymerizable mesogenic material in a planar orientation so that the axis of the molecular helix extends transversely to the layer, c) polymerizing the aligned material by exposure to heat or actinic radiation, and optionally removing the first and, if present, the second substrate from the polymerized layer, wherein the ratio of the blended mixtures A and B in each of said layers is chosen to be different from the other layers.

Particularly preferred is a method as described above, wherein said two or more layers are coated and polymerized on top of each other.

Further preferred embodiments of the the present invention relate to a method as described above, wherein at least one of said first and second substrates is a plastic film, component A1) comprises at least one achiral polymerizable mesogenic compound with two polymerizable groups, component B1) comprises at least one chiral polymerizable mesogenic compound with one polymerizable group, component B1) comprises at least one chiral polymerizable mesogenic compound with two polymerizable groups.

Another feature of the invention is a broadband reflective polarizer obtainable by a method as described above and below.

The broadband polarizer according to the inventive process is prepared by preparing different single layers of an oriented polymerized mesogenic material with a helically twisted structure, preferably with a chiral nematic (cholesteric) phase, wherein the cholesteric helix has planar orientation.

The different layers are prepared from a polymerizable material obtained by blending a mixture A comprising one or more achiral compounds with a mixture B comprising one or more chiral compounds in different ratios. As the reflection wavelength of each single layer is dependent on the amount and helical twisting power of the chiral material, the different layers exhibit different reflection wavelength. Thus, the different layers can be prepared easily from a two bottle system with two base mixtures A and B simply by varying the ratio of the base mixtures.

The single layers thus obtained can then be laminated onto each other to form a multilayer. Alternatively, it is possible to prepare a multilayer by coating and curing the single layers directly on top of each other, with the first layer serving as a substrate for the preparation of the second layer, and so on. It is also possible to cover a polymerized layer with a substrate, like e.g. a plastic film, before coating and curing the next layer on top of it. Thus, e.g. alternating bilayers of cholesteric polymer and plastic substrate can be prepared.

The reflection wavelengths of the single polymer layers can be chosen freely, depending on the desired properties of the polarizer, e.g. by varying the type and amount of chiral compounds in mixture B and the ratio of mixture A to B. Preferably the reflection wavelengths of the different single layers are selected to cover the entire visible spectrum.

The pitch variation within the multilayer can easily be controlled by arranging the single layers in the desired order. For example, a multilayer with asymmetrical pitch structure can be obtained by arranging a series of single layers in an order of increasing or decreasing wavelength, as depicted e.g. in FIG. 4. It is also possible to prepare e.g. a multilayer with symmetrical or asymmetrical pitch structure by placing two identical or different series of layers with increasing or decreasing pitch onto each side of a central layer, as depicted e.g. in FIG. 5.

Preferably the pitch of the molecular helix varies asymmetrically in a direction normal to the plane of the polarizer. Especially preferably the pitch is increasing in a direction normal to the layer from a smaller, preferably a minimum, value at one edge of the film to a higher, preferably a maximum, value at the opposite edge of the film.

The waveband reflected by an inventive reflective polarizer is ideally covering the whole visible spectrum, and is preferably within a wavelength range from 400 to 900 nm. For most applications, a reflected waveband within a range from 450 to 800 nm is acceptable.

In specific embodiments, a reflected waveband within a range from 480 to 700 nm is still suitable.

The bandwidth of the wavelength band is preferably larger than 220 nm, particularly preferably larger than 320 nm, very particularly preferably larger than 420 nm.

The transmission versus wavelength curve of the transmission spectrum of a broadband reflective polarizer according to the present invention (as depicted, for example, in FIGS. 2, 3 and 6) can be of symmetric or asymmetric shape. It can be unimodal, bimodal or exhibit a multiple peak distribution, which means that it can show one, two or more than two local maxima of reflection.

A preferred embodiment of the present invention is characterized in that the spectrum has an at least bimodal, preferably at least trimodal, peak distribution. Further preferably the spectrum shows up to 10, in particular up to 8 local reflection maxima.

In order to create linear polarized light, e.g. when used in a liquid crystal display, an inventive reflective polarizer is preferably used in combination with an optical retardation film. The optical retardation film is comprising a layer of a birefringent material selected such that its optical retardation is approximately 0.25 times the wavelength of the centre of the bandwidth reflected by the broadband reflective polarizer. As a result, this retarder serves as a quarter wave plate or foil (QWF) which converts circular polarized light into linear polarized light.

As a QWF for example a stretched plastic film, such as stretched PET, PVA, PC or TAC can be used. It is also possible to use a layer of an oriented polymerized liquid crystalline material. When a single QWF is used together with an inventive reflective polarizer, its retardation typically increases with decreasing wavelength, since the birefringence will increase towards lower wavelengths. This spread of the birefringence, which is known as dispersion, is low for some materials, like e.g. PVA, but higher for other materials, like e.g. PC and PET. This leads to a mismatch between retardation of the QWF and the wavelengths reflected by the reflective polarizer. As a result, the conversion from circularly polarized light into linearly polarized light is not optimal over the entire bandwidth of the polarizer. This can be a disadvantage in particular for broadband polarizers.

Therefore in another preferred embodiment an inventive liquid crystal display device comprises a combination of two or more optical retardation layers, the retardation of these layers being selected in such a manner that due to the difference in retardation of the layers the net retardation of the combination is approximately 0.25 times the wavelength of the light reflected by the polarizer over a substantial portion of the reflected bandwidth of the polarizer. This combination of layers is then used as a QWF together with the inventive reflective polarizer.

The QWF may be connected to the reflective polarizer as a separate optical element. Preferably, the reflective polarizer and the QWF are integrated so that they form an individual optical element. This can be done for example by laminating the QWF and the reflective polarizer together after manufacturing the polarizer.

In another preferred embodiment the polymerizable mesogenic material is coated and cured directly on a QWF which serves as a substrate, thus simplifying the production process.

Thus, according to a particularly preferred embodiment of the present invention it is possible to prepare different single cholesteric polymer layers by a process as described above, wherein as a substrate for each single cholesteric layer a QWF is used that is adapted to the reflection wavelength of the cholesteric layer, i.e. the net retardation of the QWF is approximately 0.25 times the central reflection wavelength of the cholesteric layer. Thereby, different pairs of cholesteric polymer and QWF layers are obtained.

The different pairs of cholesteric polymer and QWF layers are then laminated together to form an alternating multilayer, comprising alternating stacks of cholesteric polymer and QWF layers.

Alternatively, such an alternating multilayer can be prepared by coating and curing a first cholesteric layer onto a first QWF, covering it with a second QWF, coating and curing a second cholesteric layer onto the second QWF, etc.

In another preferred embodiment the inventive reflective polarizer and the QWF are used together with a compensation film in order to compensate the viewing angle dependence of the phase retardation of light transmitted by the reflective polarizer and the QWF. The compensation film can be positioned adjacent to either side of the QWF.

Preferably a compensation film is used of which the phase retardation is opposite in sign and substantially equal in magnitude to the phase retardation of the reflective polarizer over a wide range of viewing angles.

Particularly preferably a compensation film is used that comprises a layer of an anisotropic polymer material with a homeotropic or tilted homeotropic orientation.

The light incident on the reflective polarizer is transformed into circularly polarized light. However, this applies only to light with a wavelength corresponding to the bandwidth of the polarizer, and to light at normal incidence, i.e. parallel to the axis of the molecular helix, whereas, for example, light passing through the reflective polarizer at an angle to the normal will become elliptically polarized. This light will not be transformed completely by the QWF into linear polarized light of a single plane of polarization.

Especially when using the inventive reflective polarizer for the illumination of a liquid crystal display cell, this elliptically polarized component of light can lead to undesired reduction of the contrast of the display. Therefore in a preferred embodiment of the present invention a linear polarizer is provided in the optical path of the display after the QWF in order to cut off the component of light emitting from the reflective polarizer which is not ideally circularly polarized.

The linear polarizer disclosed above is preferably provided such that the angle between its optical axis and the major optical axis of the QWF is ranging from 30 to 60 degrees, especially preferably between 40 and 50 degrees.

A further feature of the invention is the use of an inventive broadband reflective polarizer in liquid crystal displays, projection systems, decorative and security applications.

The inventive reflective polarizer and liquid crystal display can additionally comprise other film or sheet components such as diffusers, adhesive layers, protective or release layers.

The brightness gain when using a broadband reflective polarizer according to the present invention instead of a conventional linear polarizer in a liquid crystal display is preferably at least 30% or higher, in particular preferably at least 50% or higher.

The brightness gain in this connection means the ratio of
a) the intensity of light which is transmitted after passing through an assembly, consisting of an LCD backlight, an inventive reflective polarizer, a QWF, a compensation film and a linear polarizer, and
b) the intensity of light transmitted by an assembly consisting only of the backlight and the linear polarizer of the setup described above.

The brightness gain is depending on the efficiency of the light source to re-reflect rays of light. The preferred value given above is relating to an efficient light source such as a conventional side-lit or meander type backlight.

The measured brightness gain also depends on the sample size of the reflective polarizer covering the entire area of the backlight. If the backlight is only partially covered, the brightness gain decreases due to some of the light that is reflected back from the polarizer subsequently escaping from the system.

In case of an inventive polarizer where the helical pitch of the polarizer is increasing from a minimum value at one surface of the film to a maximum value at the opposite surface of the film, the reflective polarizer is preferably situated such that its minimum pitch surface is closer to the backlight than its maximum pitch surface.

The cross over angle of a display comprising an inventive broadband reflective polarizer is preferably at least 40°, particularly preferably at least 50°. Preferably no cross over angle is observed within a 60° cone of viewing angles.

The color difference ($\Delta E^*_{uv}$ in the CIE 1976 L*u*v* color space) of a display comprising an inventive reflective broadband polarizer is preferably lower than that of a display that comprising a state of the art broadband polarizer for viewing angles from 0° to 90°, i.e. for all possible viewing angles.

A particular advantage of the inventive reflective polarizers are their improved color properties.

Apart from backlit displays, the reflective polarizer according to the present invention can also be applied in a reflective display, which instead of an electric light source makes use of a reflector that reflects light generated outside the display. The invention thus also relates to a reflective liquid crystal display device comprising an inventive reflective polarizer.

The polymerizable mesogenic compounds in mixture A and B can be monofunctional, difunctional or exhibit higher functionality, i.e. they can have one, two or more polymerizable functional groups. In a preferred embodiment of the present invention, the achiral compounds are di- or higher functional polymerizable compounds. The chiral compounds are preferably monofunctional polymerizable compounds.

Polymerizable mesogenic compounds that can be used for the inventive method are known to the expert.

The terms polymerizable mesogen, polymerizable mesogenic compound or polymerizable liquid crystal or liquid crystalline compound as used in the foregoing and the following comprise compounds with a rod-shaped, board-shaped or disk-shaped mesogenic group (i.e. a group with the ability to induce mesophase behavior in a compound comprising such a group). These compounds do not necessarily have to exhibit mesophase behavior by themselves. In a preferred embodiment of the present invention they show mesophase behavior only upon admixture with other compounds or upon polymerization of the polymerizable mesogenic compounds or the mixtures comprising them.

Preferably the polymerizable mesogenic compounds exhibit mesophase behavior on their own.

The achiral polymerizable mesogenic compounds of component A1) are preferably selected of formula I

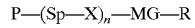

wherein

P is $CH_2=CW-COO-$, $WCH=CH-O-$,

or $CH_2=CH\text{-Phenyl-}(O)_k-$ with W being H, $CH_3$ or Cl and k being 0 or 1, Sp is a spacer group having 1 to 25 C atoms, X is a group selected from —O—, —S—, —CO—, —COO—, —OCO—, —OCO—O—, —S—CO—, —CO—S— or a single bond, n is 0 or 1, R is an achiral alkyl radical with up to 25 C atoms which may be unsubstituted, mono- or polysubstituted by halogen or CN, it being also possible for one or more non-adjacent $CH_2$ groups to be replaced, in each case independently from one another, by —O—, —S—, —NH—, —N($CH_3$)—, —CO—, —COO—, —OCO—, —OCO—O—, —S—CO—, —CO—S— or —C≡C— in such a manner that oxygen atoms are not linked directly to one another, or alternatively R is halogen, cyano or has independently one of the meanings given for P—(Sp—X)$_n$—, and MG is a mesogenic or mesogenity supporting group preferably selected of formula II

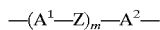   II wherein

Z is in each case independently —COO—, —OCO—, —$CH_2CH_2$—, —$OCH_2$—, —$CH_2O$—, —CH=CH—, —CH=CH—COO—, —OCO—CH=CH—, —C≡C— or a single bond, $A^1$ and $A^2$ are each independently 1,4-phenylene in which, in addition, one or more CH groups may be replaced by N, 1,4-cyclohexylene in which, in addition, one or two non-adjacent $CH_2$ groups may be replaced by O and/or S, 1,4-cyclohexenylene, or naphthalene-2,6-diyl, it being possible for all these groups to be unsubstituted, mono- or polysubstituted with halogen, cyano or nitro groups or alkyl, alkoxy, alkylcarbonyl or alkoxycarbonyl groups having 1 to 7 C atoms wherein one or more H atoms may be substituted by F or Cl, and m is 1, 2 or 3.

The chiral polymerizable compounds of component B1) are preferably selected of formula III P—(Sp*—X)$_n$—MG*—R*   III wherein P, X and n have the meanings given for formula I, Sp* is a spacer group having 1 to 25 C atoms, MG* is a mesogenic or mesogenity supporting group, which is preferably selected of formula II given above, and R* is H or an alkyl radical with up to 25 C atoms which may be unsubstituted, mono- or polysubstituted by halogen or CN, it being also possible for one or more non-adjacent $CH_2$ groups to be replaced, in each case independently from one another, by —O—, —S—, —NH—, —N($CH_3$)—, —Co—, —COO—, —OCO—, —OCO—O—, —S—CO—, —CO—S— or —C≡C— in such a manner that oxygen atoms are not linked directly to one another, or alternatively R* is halogen, cyano or has independently one of the meanings given for P—(Sp—X)$_n$—, with at least one of Sp*, MG* and R* comprising a chiral structure element.

Of the compounds of formula I and III especially preferred are those in which R and R* are F, Cl, cyano, or optionally halogenated alkyl or alkoxy, or has the meaning given for P—(Sp—X)$_n$— or P—(Sp*—X)$_n$— respectively. Further preferred are compounds wherein MG and MG* are of formula II with $Z^1$ and $Z^2$ being each independently —COO—, —OCO—, —$CH_2$—$CH_2$—, —CH=CH—COO—, —OCO—CH=CH— or a single bond.

Of the mesogenic groups wherein $A^1$ and/or $A^2$ denote a heterocyclic group, those containing a pyridine-2,5-diyl group, pyrimidine-2,5-diyl group or 1,3-dioxane-2,5-diyl group are particularly preferred.

Of the preferred mesogenic groups containing a substituted 1,4-phenylene group very particularly preferred are those substituted by F, Cl or an optionally fluorinated alkyl, alkoxy, alkylcarbonyl or alkoxycarbonyl group with 1 to 4 C atoms.

A smaller group of preferred mesogenic groups of formula II is listed below. For reasons of simplicity, Phe in these groups is 1,4-phenylene, PheL is a 1,4-phenylene group which is substituted by 1 to 4 groups L, with L being F, Cl, CN, OH, $NO_2$ or an optionally fluorinated alkyl, alkoxy or alkanoyl group with 1 to 7 C atoms, and Cyc is 1,4-cyclohexylene. The following list of preferred mesogenic groups is comprising the subformulae II-1 to II-24 as well as their mirror images

| | |
|---|---|
| -Phe-Z-Phe- | II-1 |
| -Phe-Z-Cyc- | II-2 |
| -Cyc-Z-Cyc- | II-3 |
| -PheL-Z-Phe- | II-4 |
| -PheL-Z-Cyc- | II-5 |
| -PheL-Z-PheL- | II-6 |
| -Phe-Z-Phe-Z-Phe- | II-7 |
| -Phe-Z-Phe-Z-Cyc- | II-8 |
| -Phe-Z-Cyc-Z-Phe- | II-9 |
| -Cyc-Z-Phe-Z-Cyc- | II-10 |
| -Phe-Z-Cyc-Z-Cyc- | II-11 |
| -Cyc-Z-Cyc-Z-Cyc- | II-12 |
| -Phe-Z-Phe-Z-PheL- | II-13 |
| -Phe-Z-PheL-Z-Phe- | II-14 |
| -PheL-Z-Phe-Z-Phe- | II-15 |
| -PheL-Z-Phe-Z-PheL- | II-16 |
| -PheL-Z-PheL-Z-Phe- | II-17 |
| -PheL-Z-PheL-Z-PheL- | II-18 |
| -Phe-Z-PheL-Z-Cyc- | II-19 |
| -Phe-Z-Cyc-Z-PheL- | II-20 |
| -Cyc-Z-Phe-Z-PheL- | II-21 |
| -PheL-Z-Cyc-Z-PheL- | II-22 |
| -PheL-Z-PheL-Z-Cyc- | II-23 |
| -PheL-Z-Cyc-Z-Cyc- | II-24 |
| -Cyc-Z-PheL-Z-Cyc- | II-25 |

Particularly preferred are the subformulae II-1, II-2, II-4, II-6, II-7, II-8, II-11, II-13, II-14, II-15 and II-16.

In these preferred groups Z in each case independently has one of the meanings of $Z^1$ as given in formula I. Preferably Z is —COO—, —OCO—, —$CH_2CH_2$—, —C≡C— or a single bond.

L is preferably F, Cl, CN, OH, $NO_2$, $CH_3$, $C_2H_5$, $OCH_3$, $OC_2H_5$, $COCH_3$, $COC_2H_5$, $COOCH_3$, $COOC_2H_5$, $CF_3$, OCF₃, OCHF₂, OC₂F₅, in particular F, Cl, CN, CH₃, C₂H₅, OCH₃, COCH₃ and OCF₃, most preferably F, Cl, CH₃, OCH₃ and COCH₃.

Very preferably the mesogenic groups MG and MG* are selected from the following formulae and their mirror images

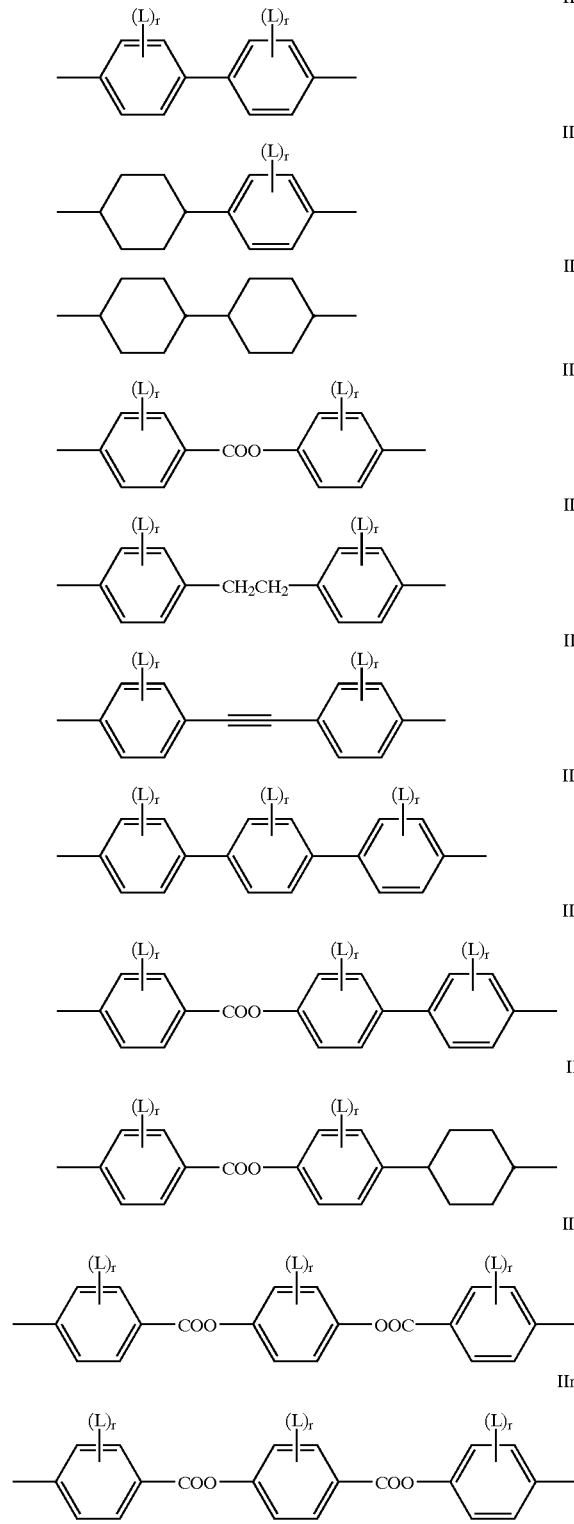

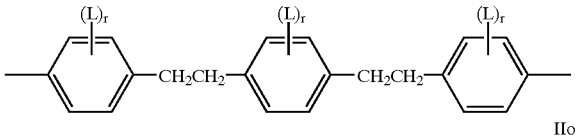

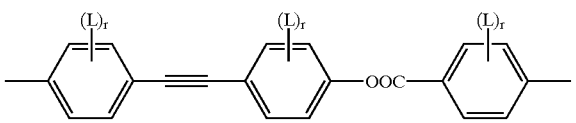

wherein L has the meaning given above and r is 0, 1 or 2.

Particularly preferred are the subformulae IId, IIg, IIh, IIi, IIk and IIo, in particular the subformulae IId and IIk.

The group

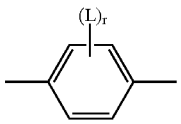

in these preferred formulae is very preferably denoting

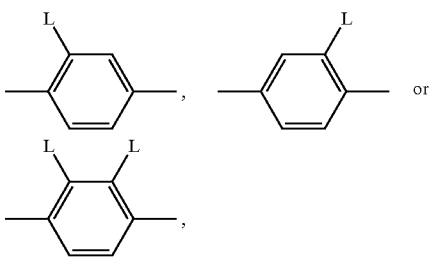

furthermore

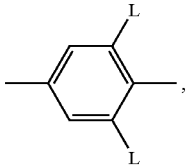

with L having each independently one of the meanings given above.

In the achiral polymerizable mesogenic compounds of the formula I, R is preferably an achiral alkyl radical which is unsubstituted or substituted by at least one halogen atom, it being possible for one or two non-adjacent CH₂ groups of these radicals to be replaced by —O—, —S—, O—CO—, —CO—O— or —O—CO—O— groups.

Halogen is preferably F or Cl.

If R is an alkyl or alkoxy radical, i.e. where the terminal CH₂ group is replaced by —O—, this may be straight-chain or branched. It is preferably straight-chain, has 1, 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, methoxy, nonoxy, decoxy, undecoxy, dodecoxy, tridecoxy or tetradecoxy, for example.

Oxaalkyl, i.e. where one CH₂ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

In the compounds of formula III R* may be an achiral or a chiral group. In case of an achiral group R* preferably has one the preferred meanings given for R above. In case of a chiral group R* is preferably selected according to the following formula IV:

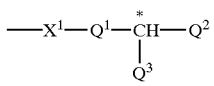

IV wherein $X^1$ has the meaning given for X, $Q^1$ is an alkylene or alkylene-oxy group with 1 to 10 C atoms or a single bond, $Q^2$ is an alkyl or alkoxy group with 1 to 10 C atoms which may be unsubstituted, mono- or polysubstituted by halogen or CN, it being also possible for one or more non-adjacent $CH_2$ groups to be replaced, in each case independently from one another, by —C≡C—, —O—, —S—, —NH—, —N(CH$_3$)—, —CO—, —COO—, —OCO—, —OCO—O—, —S—CO— or —CO—S— in such a manner that oxygen atoms are not linked directly to one another, or alternatively has the meaning given for P—Sp—, $Q^3$ is halogen, a cyano group or an alkyl or alkoxy group with 1 to 4 C atoms different from $Q^2$.

In case $Q^1$ in formula IV is an alkylene-oxy group, the O atom is preferably adjacent to the chiral C atom.

Preferred chiral groups R* are 2-butyl (=1-methylpropyl), 2-methylbutyl, 2-methylpentyl, 3-methylpentyl, 2-ethylhexyl, 2-propylpentyl, 2-octyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, for example.

In addition, mesogenic compounds of the formula I and/or III containing an achiral branched group R or R* respectively may occasionally be of importance as comonomers, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methylpropoxy and 3-methylbutoxy.

In another preferred embodiment R* in formula III is denoting a chiral group that is selected from the following groups:

an ethylenglycol derivative

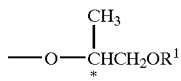

wherein $R^1$ is an alkyl radical with 1 to 12 C atoms, or a group based on citronellol

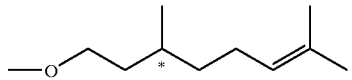

In another preferred embodiment of the present invention the compounds of formula III comprise a mesogenic or mesogenity supporting group MG* having at least one center of chirality. In these compounds MG* is preferably selected according to formula II*A or II*B:

 II*A
 II*B wherein $A^1$, $A^2$ and Z have the meaning given in formula II, R has the meaning given in formula I, a and b are independently of each other 0, 1 or 2, and $G^1$ is a terminal chiral group, such as for example a cholesteryl group, a terpenoid radical like e.g. disclosed in the WO 96/17901, particularly preferably a menthyl group, or a terminal chiral sugar derivative comprising a mono- or dicyclic radical with pyranose or furanose rings like, for example, a terminal group derived from the chiral sugars or sugar derivatives as disclosed e.g. in the international application WO 95/16007, and $G^2$ is a bivalent chiral group, like for example a (R,R)— or (S,S) hydrobenzoin group

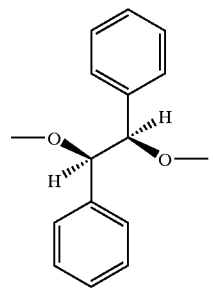

or a bivalent chiral sugar, sugar derivative or another bivalent chiral radical, as disclosed e.g. in the international application WO 95/16007, especially preferably a group based on 1,4:3,6-Dianhydro-D-sorbitol:

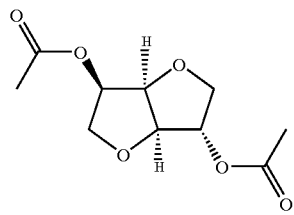

In case $G^2$ is a group based on 1,4:3,6-Dianhydro-D-sorbitol as diclosed above, Z is preferably denoting —CH=CH—.

In the compounds of formula I and III P is denoting

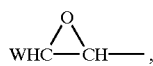

$CH_2=CW-COO$, $WCH=CH-O-$ or $CH_2=CH$-Phenyl-$(O)_k-$ with W being H, $CH_3$ or Cl and k being 0 or 1.

Preferably P is a vinyl group, a vinyloxy group, an acrylate or methacrylate group, a propenyl ether group or an epoxy group. Especially preferably P is an acrylate or methacrylate group.

The polymerizable mesogenic compounds have up to four, in particular up to three, very preferably one or two polymerizable groups.

As for the spacer groups Sp and Sp*, all groups can be used that are known for this purpose to the skilled in the art. The spacer is preferably linked to the polymerizable group P by an ester or ether group or a single bond. The spacer is preferably a linear or branched alkylene group having 1 to 20 C atoms, in particular 1 to 12 C atoms, in which, in addition, one or more, non-adjacent $CH_2$ groups may be replaced by $-O-$, $-S-$, $-NH-$, $-N(CH_3)-$, $-CO-$, $-O-CO-$, $-S-CO-$, $-O-COO-$, $-CO-S-$, $-CO-O-$, $-CH(halogen)-$, $-CH(CN)-$, $-CH=CH-$ or $-C\equiv C-$.

Typical spacer groups are for example $-(CH_2)_o-$, $-(CH_2CH_2O)_r-CH_2CH_2-$, $-CH_2CH_2-S-CH_2CH_2-$ or $-CH_2CH_2-NH-CH_2CH_2-$, with o being an integer from 2 to 12 and r being an integer from 1 to 3.

Preferred spacer groups are ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyl-iminoethylene and 1-methylalkylene, for example.

In a preferred embodiment of the invention the polymerizable mesogenic compounds of formula III comprise a spacer group Sp* that is a chiral group of the formula V:

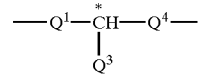

wherein $Q^1$ and $Q^3$ have the meanings given in formula IV, and $Q^4$ is an alkylene or alkylene-oxy group with 1 to 10 C atoms or a single bond, being different from $Q^1$.

Further preferred are chiral spacer groups Sp* based on naturally available materials, such as e.g. citronellol or lactate derivatives.

Particularly preferred are compounds of formula I and/or III wherein n is 1.

In another preferred embodiment, the inventive reflective polarizer is obtained by copolymerizing mixtures comprising compounds of formula I and /or formula III wherein n is 0 and compounds of formula I and/or formula III wherein n is 1.

In the event that R, R* or $Q^2$ is a group of formula P—Sp—X— or P—Sp*—X— respectively, the spacer groups on each side of the mesogenic core may be identical or different.

The polymerizable mesogenic compounds of formula I and III can be prepared by methods which are known per se and which are described, for example, in standard works of organic chemistry such as, for example, Houben-Weyl, Methoden der organischen Chemie, Thieme-Verlag, Stuttgart. Some specific methods of preparation can be taken from the examples.

Polymerizable mesogenic compounds according to formula I and III are described for example in WO 93/22397; EP 0 261 712; DE 19504224; DE 4408171 and DE 4405316. The compounds disclosed in these documents, however, are to be regarded merely as examples that should not limit the scope of this invention.

Examples representing polymerizable mesogenic compounds of formula I and III are shown in the following list of compounds, which should, however, be taken only as illustrative and is in no way intended to restrict, but instead to explain the present invention

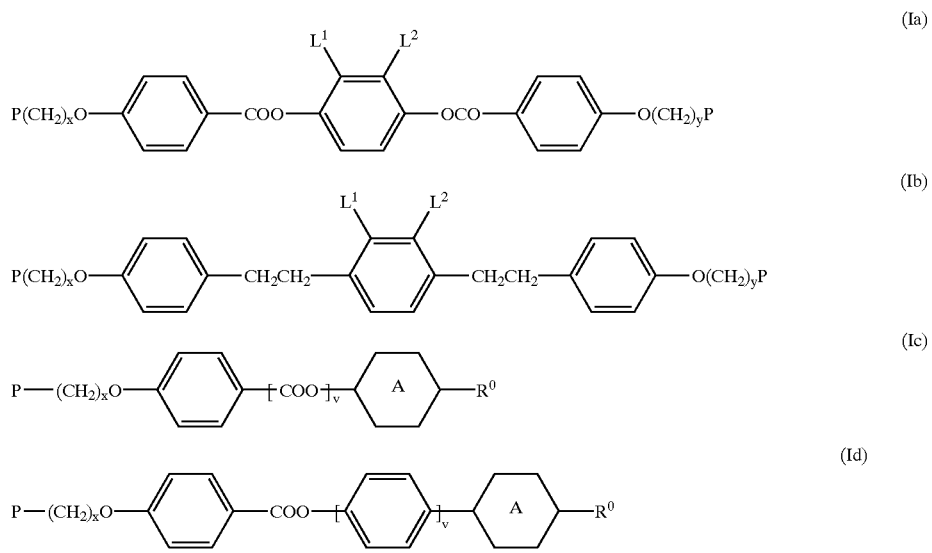

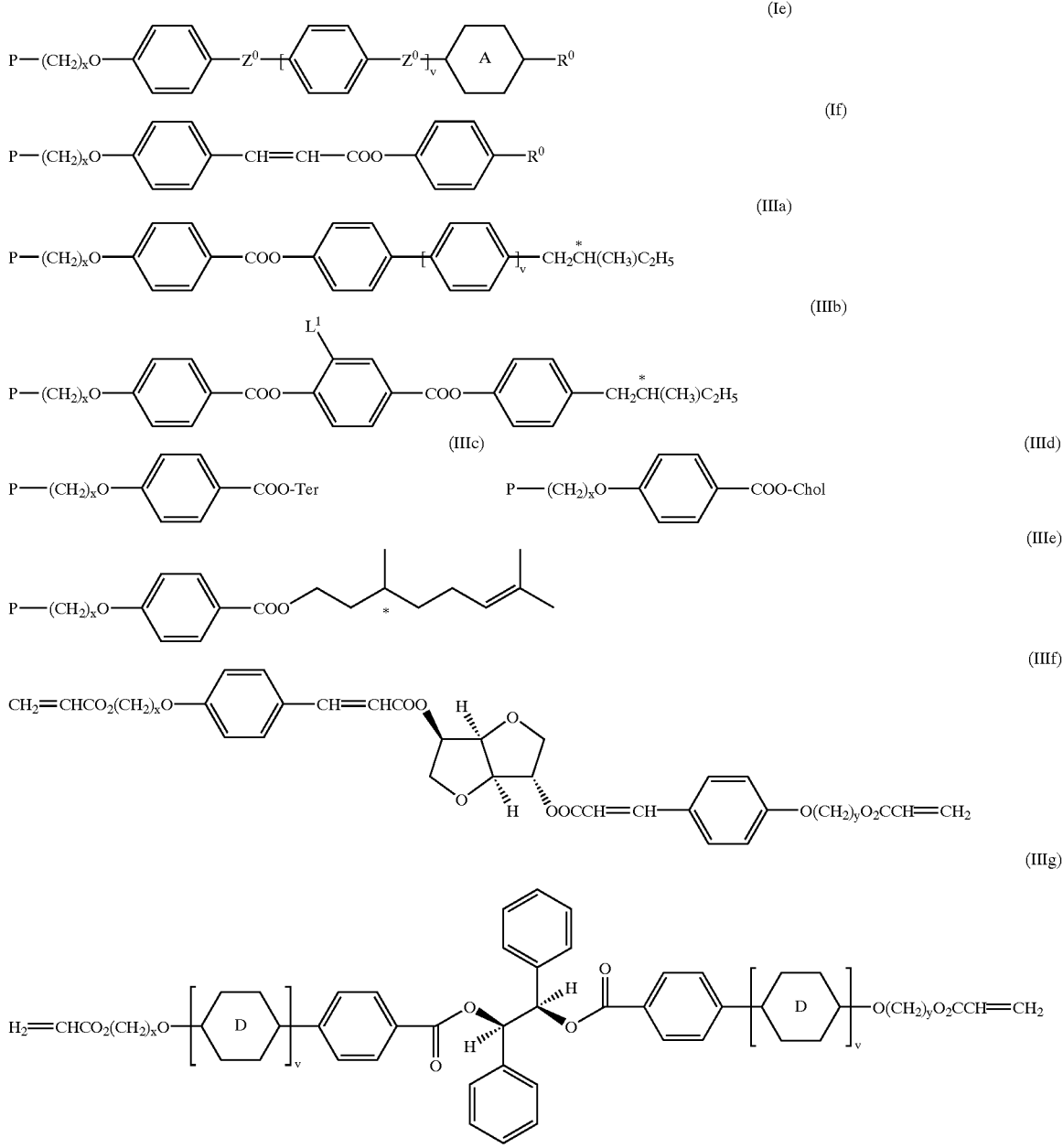

wherein P has one of the meanings of formula I and its preferred meanings as mentioned above, x and y are each independently 1 to 12, A is optionally halogenated 1,4-phenylene or 1,4-cyclohexylene, v is 0 or 1, $Z^0$ is —COO—, —OCO—, —CH$_2$CH$_2$— or a single bond, $R^0$ has one of the meanings of R in formula I and its preferred meanings as mentioned above, $L^1$ and $L^2$ have one of the meanings of L given above, Ter is a terpenoid radical like e.g. menthyl, Chol is a cholesteryl group.

In a preferred embodiment of the present invention the achiral polymerizable compounds of formula I are selected of the above formulae Ia to If wherein $R^0$ is an achiral group.

In another preferred embodiment of the present invention the chiral polymerizable compounds of formula III are selected of the above formulae IIIa to IIIg or of formula Ib to If wherein $R^0$ is a chiral group.

In another preferred embodiment of the present invention, mixture B is additionally comprising one or more non-polymerizable chiral mesogenic compounds, like for example one or more chiral dopants. Suitable dopants are e.g. the commercially available chiral dopants S 1011, R 811 or CB 15 (Merck KGaA, Darmstadt, Germany). Particularly preferably non-polymerizable chiral compounds are used that comprise at least one chiral group Sp*, MG* and/or R* as given in formula III.

Further preferred are chiral dopants selected of formula VI

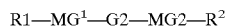

R1—MG$^1$—G2—MG2—R$^2$     VI wherein MG$^1$ and MG$^2$ each independently have one of the meanings of MG in formula II, $R^1$ and $R^2$ are each independently halogen, cyano or an optionally halogenated alkyl, alkenyl, alkoxy or alkanoyl group with 1 to 12 C atoms, and G$^2$ has the meaning of formula II*B. Very preferably $G^2$ is a chiral bivalent structure element based on a sugar molecule.

In another preferred embodiment of the present invention the chiral dopants are selected from the following formulae

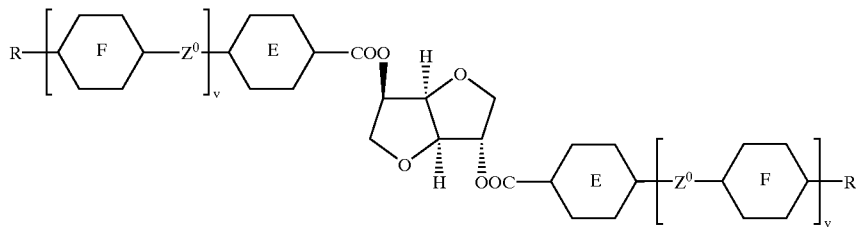

VIa

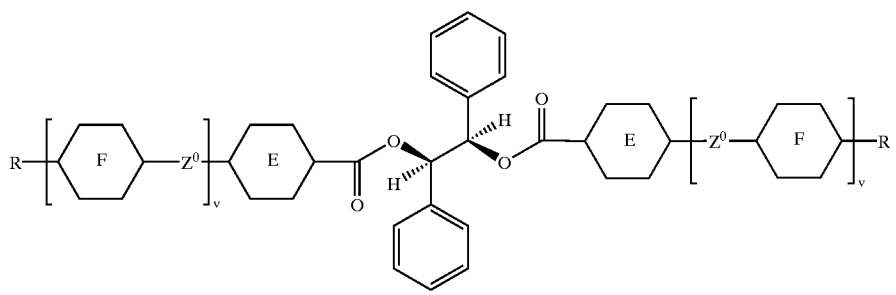

VIb including the respective (S,S) enantiomer of formula VIb, wherein E and F are each independently 1,4-phenylene or trans-1,4-cyclohexylene, V is 0 or 1, $Z^0$ is —COO—, —OCO—, —CH$_2$CH$_2$— or a single bond, and R is alkyl, alkoxy or alkanoyl with 1 to 12 C atoms.

The compounds of formula VIa and their synthesis are described in WO 98/00428. The compounds of formula VIb and their synthesis are described in GB 2,328,207, the entire disclosure of which is incorporated into this application by way of reference.

The above chiral compounds of formula VIa and VIb exhibit a very high helical twisting power (HTP), and are therefore particularly useful for the purpose of the present invention.

Mixture A preferably comprises 5 to 90%, preferably 20 to 80%, in particular 40 to 60% by weight of at least one achiral polymerizable mesogenic compound of formula I having two polymerizable groups.

Mixture B preferably comprises 5 to 90%, preferably 20 to 80%, in particular 40 to 60% by weight of at least one chiral polymerizable mesogenic compound of formula III having one polymerizable group.

Further preferred are mixtures A comprising one to five, in particular one to three compounds of component A1), two to five, in particular two to four different compounds of component A1), in component A1) one or two compounds of formula I having one polymerizable group in addition or alternatively to the difunctional compounds of formula I, in component A1) 5 to 90%, preferably 20 to 80%, in particular 20 to 30% by weight of at least one compound of formula I having one polymerizable group in addition or alternatively to the difunctional polymerizable compounds of formula I.

Further preferred are mixtures B comprising one to five, in particular one, two or three compounds of component B1), two to five, in particular two to four different compounds of component B1), in component B1) one or two compounds of formula III having two polymerizable groups in addition or alternatively to the monofunctional compounds of formula III, in component B1) 5 to 90%, preferably 20 to 80%, in particular 20 to 30% by weight of at least one compound of formula III having two polymerizable groups in addition or alternatively to the monofunctional compounds of formula III, 0.1 to 20%, preferably 0.2 to 10%, in particular 0.5 to 5% by weight of one or more, preferably one, two or three non-polymerizable chiral dopants, that can also be mesogenic, in addition to the polymerizable compounds of component B1).

In the mixtures comprising two or more different compounds of formula I and III having one polymerizable group, preferably each of the compounds is differing by at least one of the groups P, Sp, X, MG, Sp*, MG*, R or R* from each other of the compounds of the same component.

The polymerizable compounds of formula I and III in the mixtures according to the preferred embodiments described above are preferably selected of the preferred formulae Ia to Ik and IIIa to IIIm.

According to the above described process of preparing an inventive multilayer reflective polarizer, each layer is prepared by coating a polymerizable mesogenic mixture onto a substrate or between two substrates, aligning the mixture into a uniform planar orientation and curing the mixture by exposure to heat or actinic radiation in the presence of an initiator.

A detailed description of this method can be found in D. J.Broer et al., Makromol.Chem. 190, pp. 2255 ff. (1989).

As substrates for example a glass or quarz sheet as well as plastic films or sheets can be used.

Isotropic or birefringent substrates can be used. In case the substrate is not removed from the polymerized film after polymerization, preferably isotropic substrates are used.

In particular for mass production it is suitable to use plastic films as substrates, like e.g. polyester films such as polyethyleneterephthalate (PET), polyvinylalcohol (PVA), polycarbonate (PC), di- or triacetylcellulose (DAC/TAC). As a birefringent substrate for example an uniaxially stretched plastic film can be used. Preferably at least one substrate is a plastic substrate, especially preferably a PET film or a TAC film. PET films are commercially available e.g. from ICI Corp. under the trade name Melinex.

The substrates can be removed after polymerization or not. At least one substrate has to be transmissive for the actinic radiation used for the polymerization.

The polymerizable mesogenic material is coated on the substrate or between the substrates in form of a thin layer. This can be done by conventional techniques that are known to the skilled in the art.

It is also possible to add a suitable organic solvent as component A3) or component B3) to the mixtures A and B respectively before blending. Alternatively the mixtures A and B can be dissolved in a suitable solvent after blending. The solution is then coated onto the substrate and the solvent is evaporated off before curing.

As solvent, for example standard organic solvents can be used, such as ketones like e.g. methyl ethyl ketone or cyclohexanone, aromatic solvents like e.g. toluene or xylene, halogenated hydrocarbons like e.g. di- or trichloromethane, or alcohols such as e.g. methanol, ethanol or isopropyl alcohol. It is also possible to use binary, ternary or higher mixtures of the above solvents.

In a preferred embodiment of the present invention, both the mixtures A and B contain the same amount and type of solvents, so that the total solvent concentration in the blend of A and B is invariant upon changing the ratio of A to B when preparing different polymer layers.

Alternatively it is also possible that only one of the mixtures A and B is comprising a solvent, or that the mixtures are comprising different types and/or amounts of solvent. In this case, the total solvent concentration in the blend of mixtures A and B can be varied by varying the ratio of A to B.

The coated layer of the chiral polymerizable mesogenic material is then aligned to give a planar orientation, i.e. wherein the axis of the molecular helix extends transversely to the layer.

A planar orientation can be achieved for example by shearing the material, e.g. by means of a doctor blade. It is also possible to apply an alignment layer, for example a layer of rubbed polyimide or sputtered $SiO_x$, on top of at least one of the substrates or on top of the barrier layers covering the substrates.

Planar alignment can further achieved with materials and means that are well-known to the expert, and are described for example in J.Cognard, Mol.Cryst.Liq.Cryst. 78, Supplement 1, 1-77 (1981).

In another preferred embodiment, the shearing caused by putting together two substrates is sufficient to give good alignment.

Polymerization of the polymerizable material takes place by exposing it to heat or actinic radiation. Actinic radiation means irradiation with light, like UV light, IR light or visible light, irradiation with X-rays or gamma rays or irradiation with high energy particles, such as ions or electrons. Preferably polymerization is carried out by UV irradiation.

As a source for actinic radiation for example a single UV lamp or a set of UV lamps can be used. Another possible source for actinic radiation is a laser, like e.g. a UV laser, an IR laser or a visible laser.

With the inventive method, it is possible to produce oriented cholesteric polymer layers even with very short curing times that may be reduced to less than 1 minute. This makes the inventive method particularly suitable for mass production. Curing times of 10 minutes or less, in particular of 5 minutes or less, very preferably of 2 minutes or less are preferred. For mass production, curing times of 90 seconds or less, in particular 60 seconds or less, very preferably 30 seconds or less are preferred.

The polymerization is carried out in the presence of an initiator absorbing at the wavelength of the actinic radiation. For example, when polymerizing by means of UV light, a photoinitiator can be used that decomposes under UV irradiation to produce free radicals or ions that start the polymerization reaction.

When curing polymerizable mesogens with acrylate or methacrylate groups, preferably a radical photoinitiator is used, when curing polymerizable mesogens vinyl and epoxide groups, preferably a cationic photoinitiator is used.

It is also possible to use a polymerization initiator that decoposes when heated to produce free radicals or ions that start the polymerization.

As a polymerization initiator for radical polymerization for example the commercially available Irgacure® or Darocure® photoinitiators (from Ciba Geigy, Basle, Switzerland) like Irgacure 651, Irgacure 184, Darocure 1173 or Darocure 4205, or TPO (Trademark Lucirin® TPO from BASF, Ludwigshafen, Germany) can be used, whereas in case of cationic photopolymerization the commercially available UVI 6974 (Union Carbide, USA) can be used.

The mixtures A and B preferably comprise 0.01 to 10%, very preferably 0.05 to 5%, in particular 0.1 to 3% of a polymerization initiator component A2) and B2) respectively. UV photoinitiators are preferred, in particular radicalic UV photoinitiators.

Especially preferably both the mixtures A and B contain the same amount and type of initiators, so that the total initiator concentration in the polymerizable blend of A and B is invariant upon changing the ratio of A to B when preparing different polymer layers.

Alternatively it is also possible that only one of the mixtures A and B is comprising an initiator component, or that the mixtures are comprising different types and/or amounts of intitiator. In this case, the total initiator concentration in the blend of mixtures A and B can be varied by varying the ratio of A to B.

In some cases a second substrate is used that does not only aid alignment of the polymerizable composition, but also excludes oxygen that may inhibit the polymerization. Alternatively the curing can be carried out under an atmosphere of inert gas. However, curing in air is also possible using suitable photoinitiators and high lamp power. When using a cationic photoinitiator oxygen exclusion most often is not needed, but water should be excluded.

In a preferred embodiment of the invention the polymerization is carried out under an atmosphere of inert gas, preferably under a nitrogen atmosphere.

In addition to the polymerization initiators mentioned above, the mixtures A and B may also comprise one or more other suitable components such as, for example, catalysts, stabilizers, chain-transfer agents, co-reacting monomers or surface-active compounds.

In a preferred embodiment of the invention, the mixtures A and/or B comprise surfactant to improve planar alignment of polymerizable material with a low tilt angle. Suitable surfactants are described for example in J. Cognard, Mol-.Cryst.Liq.Cryst. 78, Supplement 1, 1–77 (1981). Particularly preferred are non-ionic surfactants, such as mixtures of non-ionic fluoroalkylalkoxylate surfactants selected from the following formulae

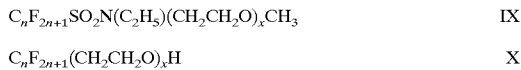

$$C_nF_{2n+1}SO_2N(C_2H_5)(CH_2CH_2O)_xCH_3 \qquad IX$$

$$C_nF_{2n+1}(CH_2CH_2O)_xH \qquad X$$

wherein n is an integer from 4 to 12 and x is an integer from 5 to 15. Upon using these surfactants it is possible to produce polymerized films with a low tilt angle in the range from 0 to 1 degrees, in particular 0 to 0.5 degrees. In the best case the tilt angle is approximately 0 degrees.

The surfactants of formula IX are commercially available under the trade name Fluorad 171 (from 3M Co.), the surfactants of formula X under the trade name Zonyl FSN (from DuPont).

In case surfactants are used, the polymerizable mesogenic material contains preferably from 500 to 2500 ppm, in particular from 1000 to 2500 ppm, very preferably from 1500 to 2500 ppm of surfactants. Further preferred materials contain 0.01 to 5%, in particular 0.1 to 3%, very preferably 0.2 to 2% by weight of surfactants.

In a preferred embodiment of the invention, the mixtures A and/or B comprise a stabilizer that is used to prevent undesired spontaneous polymerization for example during storage of the composition. As stabilizers in principal all compounds can be used that are known to the skilled in the art for this purpose. These compounds are commercially available in a broad variety. Typical examples for stabilizers are 4-ethoxyphenol or butylated hydroxytoluene (BHT). The amount of the stabilizer in the polymerizable mixture is preferably from 1 to 1000 ppm, especially preferably from 10 to 500 ppm.

Other additives, like e.g. chain transfer agents, can also be added to the mixtures A and B in order to modify the physical properties of the resulting polymer film. For example when adding a chain transfer agent, the length of the free polymer chains and/or the length of the polymer chains between two crosslinks in the inventive polymer film can be controlled. When the amount of the chain transfer agent is increased, polymer films with decreasing polymer chain length are obtained.

In a preferred embodiment of the present invention the mixtures A and/or B comprise 0.01 to 15%, in particular 0.1 to 10%, very preferably 0.5 to 5% of a chain transfer agent. The polymer films according to this preferred embodiment show especially good adhesion to a substrate, in particular to a plastic film, like e.g. a TAC film. Furthermore, by using polymerizable mesogenic mixtures comprising a chain transfer agent a reflective polarizer with increased bandwidth can be obtained.

As a chain transfer agent for example monofunctional thiol compounds like e.g. dodecane thiol or multifunctional thiol compounds like e.g. trimethylpropane tri(3-mercaptopropionate) can be used.

To obtain polymer films with the desired helically twisted planar molecular structure with a good orientation the polymerization has to be carried out in the liquid crystal phase of the polymerizable mesogenic mixture. Therefore preferably polymerizable mesogenic mixtures with low melting points and broad liquid crystal phase ranges are preferred. The use of such mixtures allows reduction in the polymerization temperature, which makes the polymerization process easier and is of importance especially for mass production. Polymerization temperatures below about 120° C are preferred. Especially preferred are temperatures below about 90° C., in particular temperatures of about 60° C. or less.

The selection of suitable polymerization temperatures depends mainly on the clearing point of the polymerizable material and inter alia on the softening point of the substrate. Preferably the polymerization temperature is at least 30° C. below the clearing temperature of the polymerizable mesogenic mixture.

The thickness of a single polymerized layer in the inventive process is preferably 2 to 6 µm. The total thickness of an inventive multilayer broadband reflective polarizer is preferably 6 to 30 µm, in particular 10 to 20 µm.

It is also possible, in order to increase crosslinking of the polymers, to add up to 20% of a non mesogenic compound with two or more polymerizable functional groups to the mixtures A and/or B alternatively or in addition to the di- or multifunctional polymerizable mesogenic compounds to increase crosslinking of the polymer.

Typical examples for difunctional non mesogenic monomers are alkyldiacrylates or alkyldimethacrylates with alkyl groups of 1 to 20 C atoms. Typical examples for non mesogenic monomers with more than two polymerizable groups are trimethylpropanetrimethacrylate or pentaerythritoltetraacrylate.

In a preferred embodiment the mixtures A and/or B comprise up to 70%, preferably 3 to 50% of a non mesogenic compound with one polymerizable functional group. Typical examples for monofunctional non mesogenic monomers are alkylacrylates or alkylmethacrylates.

It is also possible to add, for example, a quantity of up to 20% by weight of a non polymerizable liquid-crystalline compound to adapt the optical properties of the inventive reflective polarizer.

The inventive broadband reflective polarizers are useful in liquid crystal displays, as optical or color filters in displays or projection systems, as decorative image, for the preparation of cholesteric pigments and in security uses, such as non-forgeable documents like identity or credit cards, banknotes etc.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight. All physical properties given are given for a temperature of 20° C. unless explicitly stated otherwise. The following and the foregoing abbreviations are used to illustrate the liquid crystalline phase behavior of the compounds:

C=crystalline; N=nematic; S=smectic; Ch=cholesteric; I=isotropic. The numbers between these symbols indicate the phase transition temperatures in degree Celsius.

The entire disclosures of all applications, patents and publications, cited above and below and with corresponding EP No. 99112661.6 are hereby incorporated by reference.

Example 1

The polymerizable mixtures A and B were prepared

| Mixture A | wt. % | Mixture B | wt. % |
|---|---|---|---|
| Compound (I) | 60.0 | Compound (II) | 60.0 |
| Irgacure 651 | 1.0 | Irgacure 651 | 1.0 |
| 2-Butanone | 23.4 | 2-Butanone | 23.4 |
| Cyclohexanone | 15.6 | Cyclohexanone | 15.6 |

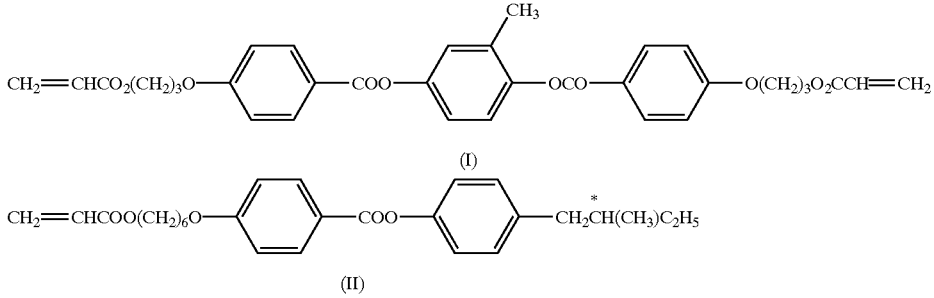

The preparation of the achiral compound (I) is described in D. J.Broer et al., Makromol.Chem. 190, 3201–3215 (1989), the preparation of the chiral compound (II) is described in U.S. Pat. No. 5,560,864. Irgacure 651® is a commercially available photoinitiator (from Ciba Geigy, Basel, Switzerland).

The mixtures were filtered through 1 µm total exclusion PTFE membrane to remove large particles and then blended to give mixtures 1a–14a with different reflection color. The composition and central reflection wavelength $\lambda_0$ of the blended mixtures are shown in table 1, therein the compositions are expressed as the ratio of achiral compound (I) and chiral compound (II).

TABLE 1

Composition and Reflection Wavelength $\lambda_0$ of Polymerizable Mixtures

| Mix. No. | wt. % (I) | wt. % (II) | $\lambda_0$ (nm) |
|---|---|---|---|
| 1a | 61 | 39 | 720 |
| 2a | 58 | 42 | 700 |
| 3a | 57.75 | 42.25 | 660 |
| 4a | 57.5 | 42.5 | 645 |
| 5a | 57.25 | 42.75 | 652 |
| 6a | 57 | 43 | 616 |
| 7a | 56 | 44 | 610 |
| 8a | 54 | 46 | 590 |
| 9a | 50 | 50 | 550 |
| 10a | 44 | 56 | 500 |
| 11a | 42 | 58 | 480 |
| 12a | 38 | 62 | 438 |
| 13a | 36 | 64 | 420 |
| 14a | 30 | 70 | 410 |

FIG. 1 shows a graph of the central reflection wavelength of the exemplarily selected mixtures 1a, 3a, 6a, 9a, 10a, 11a, 12a and 14a respectively, versus the respective ratio of the achiral compound (I).

Circular polarizing polymer films were prepared from these mixtures as follows: Each of the mixtures shown in table 1 was filtered through 0.45 µm total exclusion PTFE membrane and coated onto a TAC film (Triphan® 95, from Lonza AG, Switzerland, 80 µm thickness) using a 6 µm wire wound bar, to give an approximately 4 µm thick dry weight coating. Each coating was dried for 30 seconds at 65° C., cooled back to 25° C. and then laminated to a PET interleave film (Melinex 569®, from ICI Corp., thickness 125 µm print receptive side). The coating was then cured by exposure to 254 nm UV radiation for 10 seconds at 100 W/cm² from a medium pressure mercury lamp to give a polymerized cholesteric film. The laminate was then peeled apart to leave a cholesteric polymer film attached to the TAC film.

The spectrum of each single circular polarizer film was measured and the central reflection wavelength $\lambda_0$ determined. In all cases the reflection wavelength of the polymer film was substantially the same as that of the corresponding unpolymerized mixture.

Figure 2:
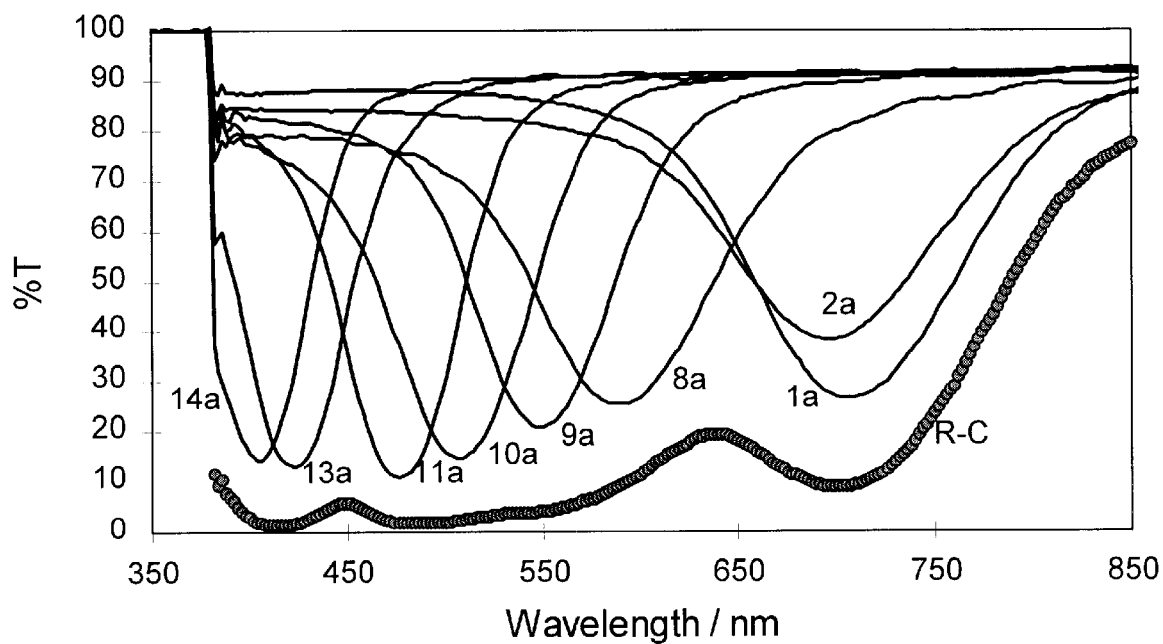
FIG. 2 shows the reflection peaks of a number of several polymerizable cholesteric mixtures according to example 1, together with the reflection spectrum of a composite spectrum (R-C) calculated from the reflection peaks of the single mixtures.

The reflection peaks of the initially produced mixtures/polymer films were summed together numerically and a composite spectrum was produced for the transmitted and reflected handednesses of circularly polarized light. FIG. 2 shows the reflection band of a composite spectrum (R-C) summed up from the mixtures 1a, 2a, 8a, 9a, 10a, 11a, 13a and 14a, together with the single reflection peaks of the mixtures.

The composite spectrum shows where in the visible range there is incomplete reflection, e.g. in FIG. 2 at 450 and 650 nm. This enables intermediate mixtures and films to be made, in order to improve the coverage of the entire visible spectrum by the individual films. Repetition of this process enabled tuning of the mixtures to an optimum.

In this way, a set of mixtures was selected, comprising mixtures 2a, 5a, 6a, 9a, 10a, 11a, 12a and 14a, which should cover the visible spectrum. The polymer films 2b, 5b, 6b, 9b, 10b, 11b, 12b and 14b were then prepared from these mixtures as described above. The central reflection wavelength $\lambda_0$ of the polymer films is shown in table 2.

TABLE 2

Composition and Reflection Wavelength of Polymerizable Mixtures and Polymer Films obtained thereof

| Mix. No. | wt. % (I) | wt. % (II) | Film No. | $\lambda_0$ (nm) |
|---|---|---|---|---|
| 2a | 58 | 42 | 2b | 700 |
| 5a | 57.25 | 42.75 | 5b | 652 |
| 6a | 57 | 43 | 6b | 616 |
| 9a | 50 | 50 | 9b | 550 |
| 10a | 44 | 56 | 10b | 500 |
| 11a | 42 | 58 | 11b | 480 |
| 12a | 38 | 62 | 12b | 438 |
| 14a | 30 | 70 | 14b | 410 |

The reflection peaks of these polymer films were summed together numerically and a composite spectrum was produced for the transmitted and reflected handednesses of circularly polarized light.

Figure 3:
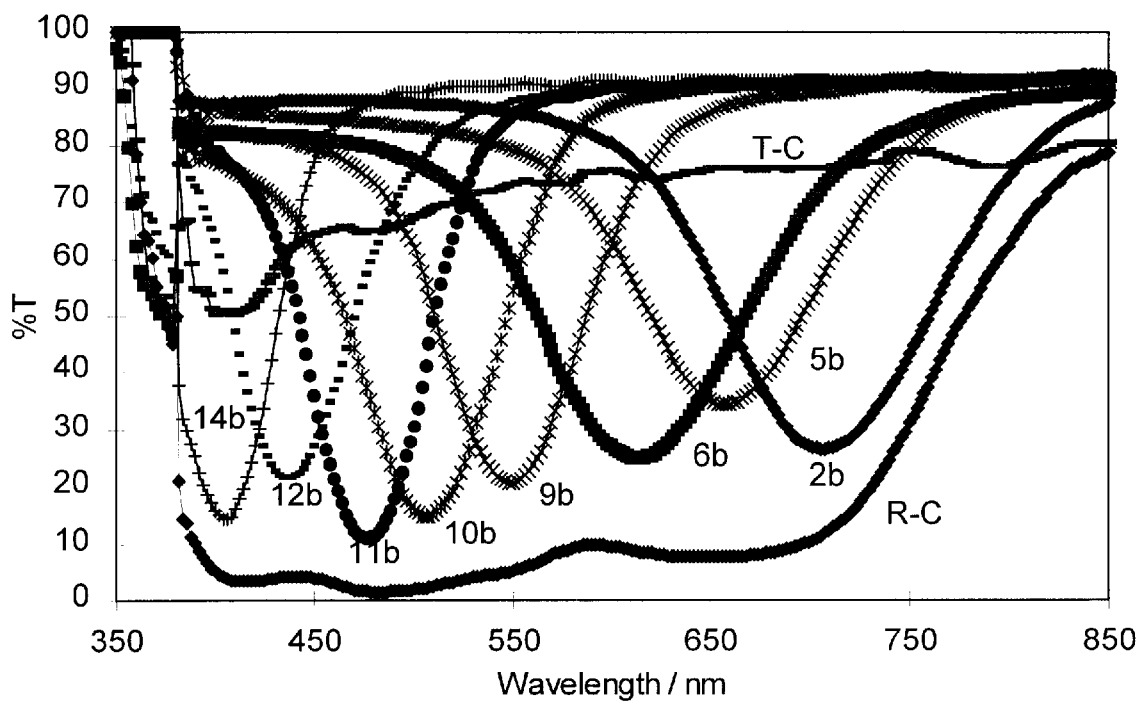
FIG. 3 shows the reflection peaks of a number of single cholesteric polymer films prepared according to example 1, together with the composite transmission and reflection spectrum (T-C, R-C) calculated from the reflection peaks of the single films, with T indicating the transmitted and R the reflected light.

This composite spectrum is shown in FIG. 3, with T-C indicating the transmitted and R-C the reflected light, together with the single reflection peaks of the films 2b, 5b, 6b, 9b, 10b, 11b, 12b, 14b. It can be seen that, compared with FIG. 2, the calculated spectrum now covers the entire wavelength range from 400 to more than 750 nm.

Example 2

Figure 4:
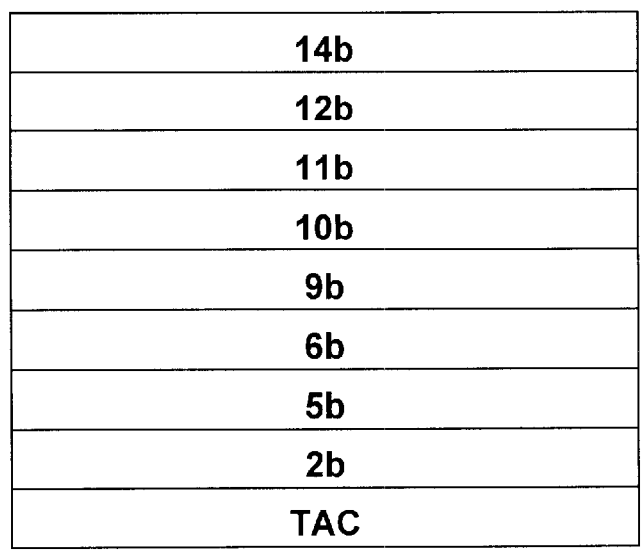
FIG. 4 schematically depicts the structure of the multilayer cholesteric polymer film P1 according to example 2.

Two broadband reflective polarizers were fabricated from the optimized set of mixtures 2a, 5a, 6a, 9a, 10a, 11a, 12a and 14a as follows:

The mixture 2a was coated and cured onto a TAC film as described in Example 1. Each of the mixtures 5a, 6a, 9a, 10a, 11a, 12a and 14a was then subsequently coated and cured as a thin layer in the above sequence directly onto the previously cured mixture. In each case, a sheet of Melinex 569® was applied on top of the coated unpolymerized layer to improve alignment, and was removed after polymerization of the layer, before coating the next layer. This yielded a multilayer cholesteric polymer film P1 comprising a stack of polymerized layers 2b–14b, as schematically depicted in FIG. 4.

The transmission versus wavelength spectrum of the resulting polymer film P1 was measured within a wavelength range from 350 to 850 nm. The maximum and minimum edge wavelengths of the reflection band, defined as the points with the highest slope, were found to be 730 nm and 442 nm respectively.

Figures 5, 6:
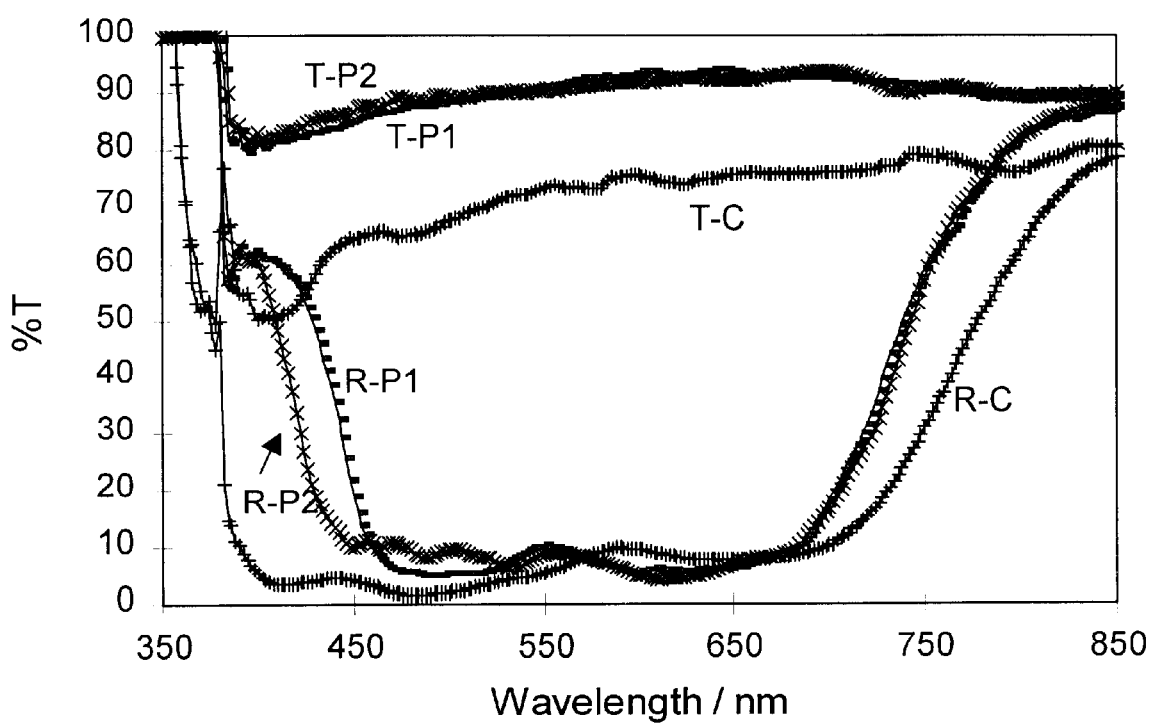
FIG. 5 schematically depicts the structure of the multilayer cholesteric polymer film P2 according to example 2.
FIG. 6 shows the reflection spectra of the multilayer cholesteric polymer films P1 (R-P1, T-P1) and P2 (R-P2, T-P2) according to example 2, together with the composite reflection spectrum (R-C, T-C) calculated from the reflection peaks of the corresponding single layer films, with T indicating the transmitted and R the reflected light.

The mixtures 2a, 5a, 6a, 9a, 10a, 11a, 12a and 14a were coated and cured as thin layers as described above in the same color sequence, but with the TAC film situated in the centre of the layers. This yielded a multilayer polymer film P2 comprising a stack of polymerized layers 2b–14b as schematically depicted in FIG. 5. The film P2 exhibited an improved cosmetic appearance compared to the film P1.

The transmission versus wavelength spectrum of the resulting polymer film P2 was measured within a wavelength range from 350 to 850 nm. The maximum and minimum edge wavelengths of the reflection band, defined as the points with the highest slope, were found to be 738 nm and 418 nm respectively.

FIG. 6 shows the measured spectra of the multilayer films P1 (R-P1, T-P1) and P2 (R-P2, T-P2), together with the theoretical spectrum (R-C, T-C) calculated from the reflection peaks of the single films 2b, 5b, 6b, 9b, 10b, 11b, 12b and 14b as described in example 1. T is indicating the transmitted and R the reflected light.

The optical performance of the multilayer films P1 and P2 was evaluated in combination with a QWF and a homeotropic compensator, and was compared with the performance of a broadband reflective polarizer comprising a single cholesteric polymer layer with varying pitch, as described in the WO 97/35219. This prior art broadband reflective polarizer exhibited a bandwidth of 500 to 800 nm, i.e. a bandwidth of 300 nm. The results are shown in table 3.

The different properties shown in table 3 were measured using a Minolta color camera for 12×9 cm samples against a backlight. The camera was rotated to record color and luminance values from +60° to −60° in the horizontal plane. The data was then used in to calculate brightness gain, crossover angle and other color properties.

From the data in table 3, it can be seen that in some aspects the multilayer broadband reflective polarizers according to the present invention performs better than a prior art reflective polarizer, for example they exhibit a lower off axis color and chroma change.

Example 3

The polymerizable mixtures C and D were prepared

| Mixture C | wt. % | Mixture D | wt. % |
|---|---|---|---|
| Compound (I) | 54.45 | Compound (II) | 54.45 |
| Irgacure 369 | 0.55 | Irgacure 369 | 0.55 |
| 2-Butanone | 27.00 | 2-Butanone | 27.00 |
| Cyclohexanone | 18.00 | Cyclohexanone | 18.00 |

Irgacure 369® is a commercially available photoinitiator (from Ciba Geigy, Basel, Switzerland).

The mixtures C and D were blended to give four different mixtures 15a–18a with different reflection color. The composition, central reflection wavelength $\lambda_0$ and color of mixtures 15a–18a is given in table 4.

TABLE 4

Composition and color of mixtures 15a–18a

| Mixture | wt. % Mix. C | wt. % Mix D | $\lambda_0$ | Color |
|---|---|---|---|---|
| 15a | 55.0 | 45.0 | 490 | blue |
| 16a | 49.6 | 50.4 | 542 | green |
| 17a | 39.3 | 60.7 | 696 | red |
| 18a | 32.5 | 67.5 | 810 | red |

Figure 7:
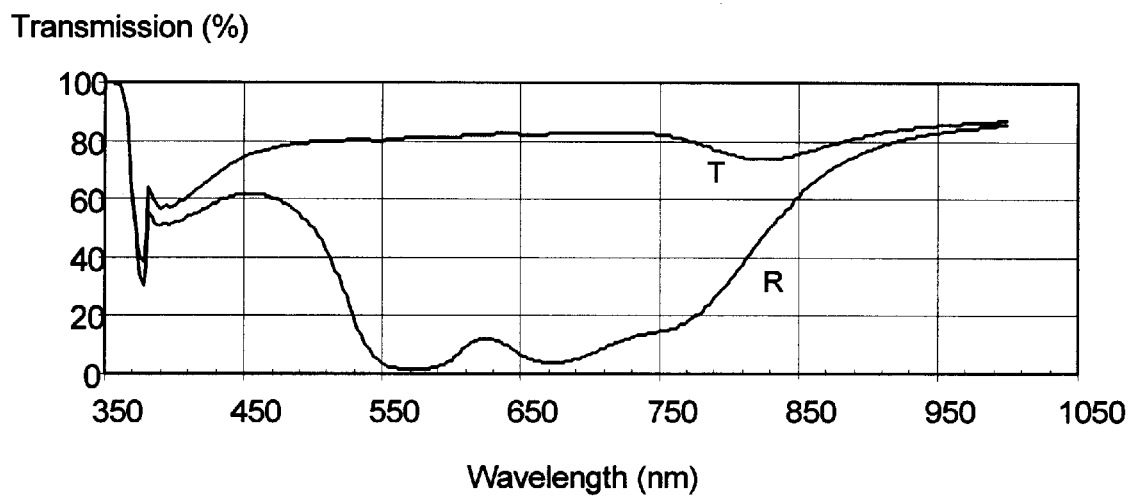
FIG. 7 shows the reflection spectrum of the multilayer cholesteric polymer film P3 according to example 3, with T indicating the transmitted and R the reflected light.

A broadband reflective polarizer was prepared by coating and curing mixture 15a as a thin layer onto a PET substrate, and subsequently coating and curing layers of mixture 16a, 17a and 18a in this sequence on top of the previously cured layer. The multilayer reflective polarizer P3 thus obtained exhibited a total thickness of 22 μm and the following sequence of polymerized layers 15b–18b P3: PET-15b-16b-17b-18b The reflection spectrum of polarizer P3 is shown in FIG. 7, with T indicating the transmitted and R the reflected light. The polarizer exhibited a broad reflection band with a bandwidth of about 290 nm and a central reflection wavelength of 668 nm.

Figure 8:
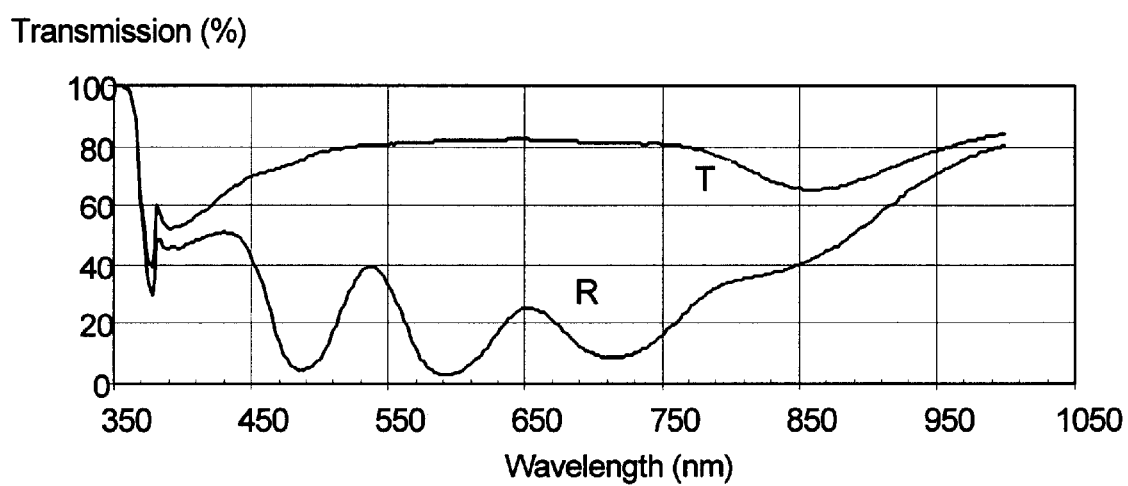
FIG. 8 shows the reflection spectrum of the multilayer cholesteric polymer film P4 according to example 3, with T indicating the transmitted and R the reflected light.

A broadband reflective polarizer P4 was prepared in the same way, but with the layer sequence being P4: PET-18b-17b-16b-15b i.e. the mixture 18a was directly coated onto the PET substrate. The reflection spectrum of polarizer P4 is shown in FIG. 8, with T indicating the transmitted and R the reflected light. The polarizer exhibited a broad reflection band showing three peaks, with a total bandwidth of more than 300 nm.

The multilayer polarizer P4 was removed from its PET substrate and two samples thereof were laminated to a TAC film covered with polystyrene-acryinitrile copolymer (PSA), wherein either the blue side (i.e. layer 15b) or red side (i.e. layer 18b) contacted the PSA.

Thereby, the polarizers P5 and P6 with the following layer sequences were obtained P5: TAC-PSA-15b-16b-17b-18b P6: TAC-PSA-18b-17b-16b-15b The optical performance of the reflective polarizers P3 to P6 was measured as described in example 2. The results are shown in table 5.

TABLE 5

Optical Performance of Inventive Polarizers P3–P6

| Film | Brightness gain/% | Crossover angle/° | Chroma @ 45° |
|---|---|---|---|
| P3 (red side to lamp) | 16 | 40 | 14.7 |
| P4 (blue side to lamp) | 14 | 44 | 9.3 |
| P5 (blue side to lamp) | 21 | 35 | 19.6 |
| P6 (red side to lamp) | 18 | 40 | 7.3 |

EXAMPLE 4

The mixtures C and D from example 3 were blended to give the mixtures 19a–22a with different reflection color. The composition, central reflection wavelength $\lambda_0$ and color of mixtures 19a–22a is given in table 6.

TABLE 6

Composition and color of mixtures 19a–22a

| Mixture | wt. % Mix. C | wt. % Mix D | $\lambda_0$ | Color |
|---|---|---|---|---|
| 19a | 54.2 | 46.5 | 505 | blue |
| 20a | 46.7 | 50.4 | 575 | green |
| 21a | 41.3 | 67.5 | 645 | orange |
| 22a | 36.1 | 60.7 | 715 | red |

Figure 9:
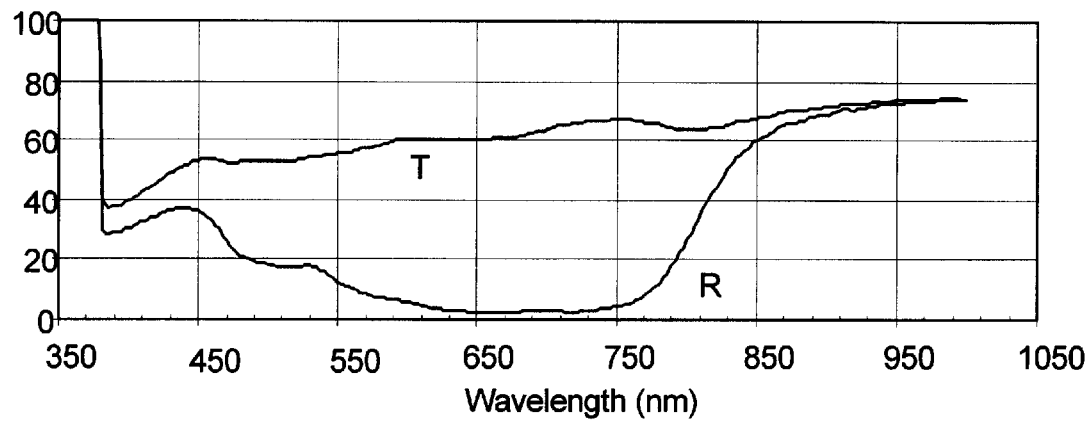
FIG. 9 shows the reflection spectrum of the multilayer cholesteric polymer film P7 according to example 4, with T indicating the transmitted and R the reflected light.
Figure 10:
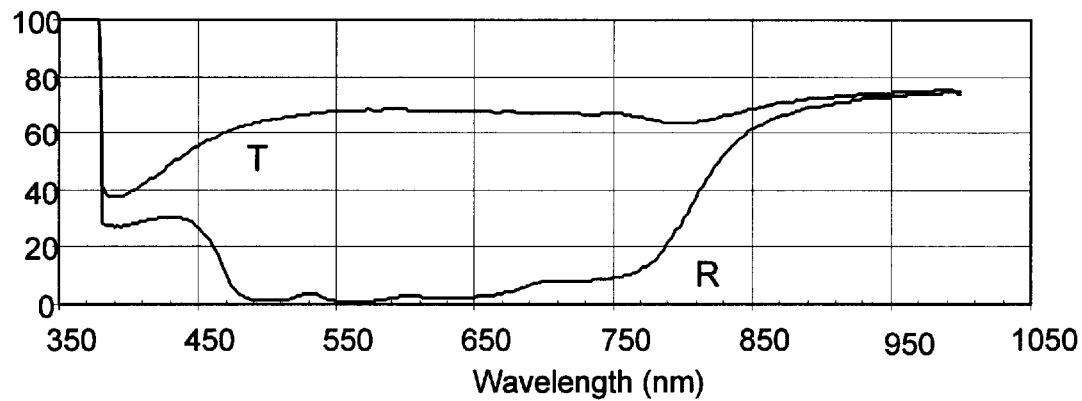
FIG. 10 shows the reflection spectrum of the multilayer cholesteric polymer film P8 according to example 4, with T indicating the transmitted and R the reflected light.

Two broadband reflective polarizers P7 and P8 were prepared as described in example 3, with the sequence of polymerized layers 19b–21b being P7: TAC-PSA-19b-20b-21b-22b P8: TAC-PSA-22b-21b-20b-19b The reflection spectrum of polarizers P7 and P8 are shown in FIGS. 9 and 10 respectively, with T indicating the transmitted and R the reflected light. The polarizers exhibited a broad reflection band with a bandwidth of 338 and 340 nm respectively and a central reflection wavelength of 637 nm. The optical performance of the reflective polarizers P7 and P8 was measured as described in example 2. The results are shown in table 7.

TABLE 7

Optical Performance of Inventive Polarizers P7 and P8

| Film | Brightness gain/% | Crossover angle/° | Chroma @ 45° |
|---|---|---|---|
| P7 (blue side to lamp) | 18 | 27 | 10.8 |
| P8 (red side to lamp) | 12 | 17 | 13.9 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make carious changes and modifications of the invention to adapt it to various usages and conditions.

What is claimed is:

1. Method of preparing a broadband reflective polarizer comprising two or more layers of a polymerized mesogenic material with helically twisted molecular structure and planar orientation, wherein each of said layers is prepared by:
   a) blending a first mixture A comprising
      A1) a least one achiral polymerizable mesogenic compound,
      A2) optionally a polymerization initiator component,
      A3) optionally an organic solvent component, with a second mixture B1 comprising
         B1) at least one chiral polymerizable mesogenic compound,
         B2) optionally a polymerization initiator component,
         B3) optionally an organic solvent component, to obtain a chiral polymerizable mesogenic material;
   b) coating a layer of the blended mixtures A and B onto a first substrate or between a first and a second substrate, and aligning the chiral polymerizable mesogenic material in a planar orientation so that the axis of the molecular helix extends transversely to the layer; and
   c) polymerizing the aligned material and optionally removing the first and, if present, the second substrate from the polymerized layer,
wherein in at least one layer the ratio of the blended mixtures A and B is different from at least one other layer and where in two or more of said layers are coupled together.

2. The method according to claim 1, wherein two or more of said layers are coupled together by coating and polymerizing on top of each other.

3. The method according to claim 1 wherein at least one said first and/or second substrates is a plastic film.

4. The method according to claim 1 wherein the component A1) comprises at least one achiral polymerizable mesogenic compound with two polymerizable groups.

5. The method according to claim 1 wherein the component B1) comprises at least one chiral polymerizable mesogenic compound with one polymerizable group.

6. The method according to claim 1 wherein at least one of said first and second substrates is a layer prepared as described in steps a), b) and c).

7. The method according to claim 1 wherein polymerizing the aligned material is by exposure to heat or actinic radiation.

8. The method according to claim 1, wherein two or more of said layers are coupled together by covering the polymerized layer with a substrate before coating and curing a next layer.

9. The method according to claim 8, wherein the substrate is a plastic film.

10. The method according to claim 1, wherein two or more of said layers are coupled together by laminating onto each other to form a multilayer.

11. The method according to claim 1, wherein two or more of said layers are prepared individually and then are coupled together by laminating onto each other to form a multilayer.

12. A broadband reflective polarizer comprising two or more layers of a polymerized mesogenic material with helically twisted molecular structure and planar orientation made by the method according to claim 1, further comprising a compensation film comprising a layer of an anisotropic polymer material with a homeotropic or a tilted homeotropic orientation.

13. A broadband reflective polarizer comprising two or more layers of a polymerized mesogenic material with helically twisted molecular structure and planar orientation made by the method according to claim 1, having a helical pitch increasing from a minimum value at one surface of a film to a maximum value at an opposite surface of the film.

14. A broadband reflective polarizer according to claim 13, wherein the bandwidth of the reflected wavelength band is at least 220 nm.

15. A liquid crystal display, a projection system, or a security device comprising a broadband reflective polarizer according to claim 13.

16. A liquid crystal display comprising an LCD backlight and a reflective polarizer according to claim 13, with a pitch surface situated so its minimum pitch surface is closer to the backlight than its maximum pitch surface.

17. A broadband reflective polarizer according to claim 13, wherein the reflected wavelength band is 400–900 nm.

18. A broadband reflective polarizer according to claim 13, further comprising an optical retardation film with a retardation approximately 0.25 times a wavelength of a center of a bandwidth reflected by the broadband polarizer.

19. A broadband reflective polarizer according to claim 13, further comprising a combination of two or more optical retardation layers so that a net retardation of the combination is approximately 0.25 times a wavelength of a light reflected by the broadband polarizer over a substantial portion of a reflected bandwidth.

* * * * *